United States Patent [19]

Marcus

[11] 4,075,468
[45] Feb. 21, 1978

[54] VISOR AND MIRROR ASSEMBLY
[75] Inventor: Konrad H. Marcus, Holland, Mich.
[73] Assignee: Prince Corporation, Holland, Mich.
[21] Appl. No.: 775,714
[22] Filed: Mar. 9, 1977

Related U.S. Application Data

[63] Continuation of Ser. No. 595,894, July 14, 1975, abandoned.

[51] Int. Cl.² .......................... B60J 3/00; F21V 33/00
[52] U.S. Cl. .................................. 362/144; 296/97 H
[58] Field of Search ............................ 240/4.2, 7.1 A; 296/97 B, 97 C, 97 H

[56] References Cited
U.S. PATENT DOCUMENTS

| 2,123,319 | 7/1938 | Thompson | 240/4.2 |
| 2,148,557 | 2/1939 | Hook | 296/97 C X |
| 2,262,875 | 11/1941 | Almen | 240/4.2 |
| 2,268,189 | 12/1941 | Colbert | 240/4.2 |
| 3,211,903 | 10/1965 | McElreath | 240/4.2 |
| 3,305,679 | 2/1967 | Barcita-Peruchena | 240/4.2 X |
| 3,576,409 | 4/1971 | Fiddler | 240/7.1 A |
| 3,751,106 | 8/1973 | Mahler et al. | 296/97 H |
| 3,794,828 | 2/1974 | Arpino | 240/4.2 |
| 3,871,703 | 3/1975 | Accatino | 296/97 H |

FOREIGN PATENT DOCUMENTS 2,027,386  12/1971  Germany ........................ 296/97 B Primary Examiner—Donald A. Griffin
Attorney, Agent, or Firm—Fisher, Gerhardt & Groh

[57] ABSTRACT

A visor and vanity mirror assembly in which the vanity mirror is illuminated through electrical circuitry mounted on the back side of the mirror.

21 Claims, 7 Drawing Figures

U.S. Patent  Feb. 21, 1978  Sheet 1 of 2  4,075,468
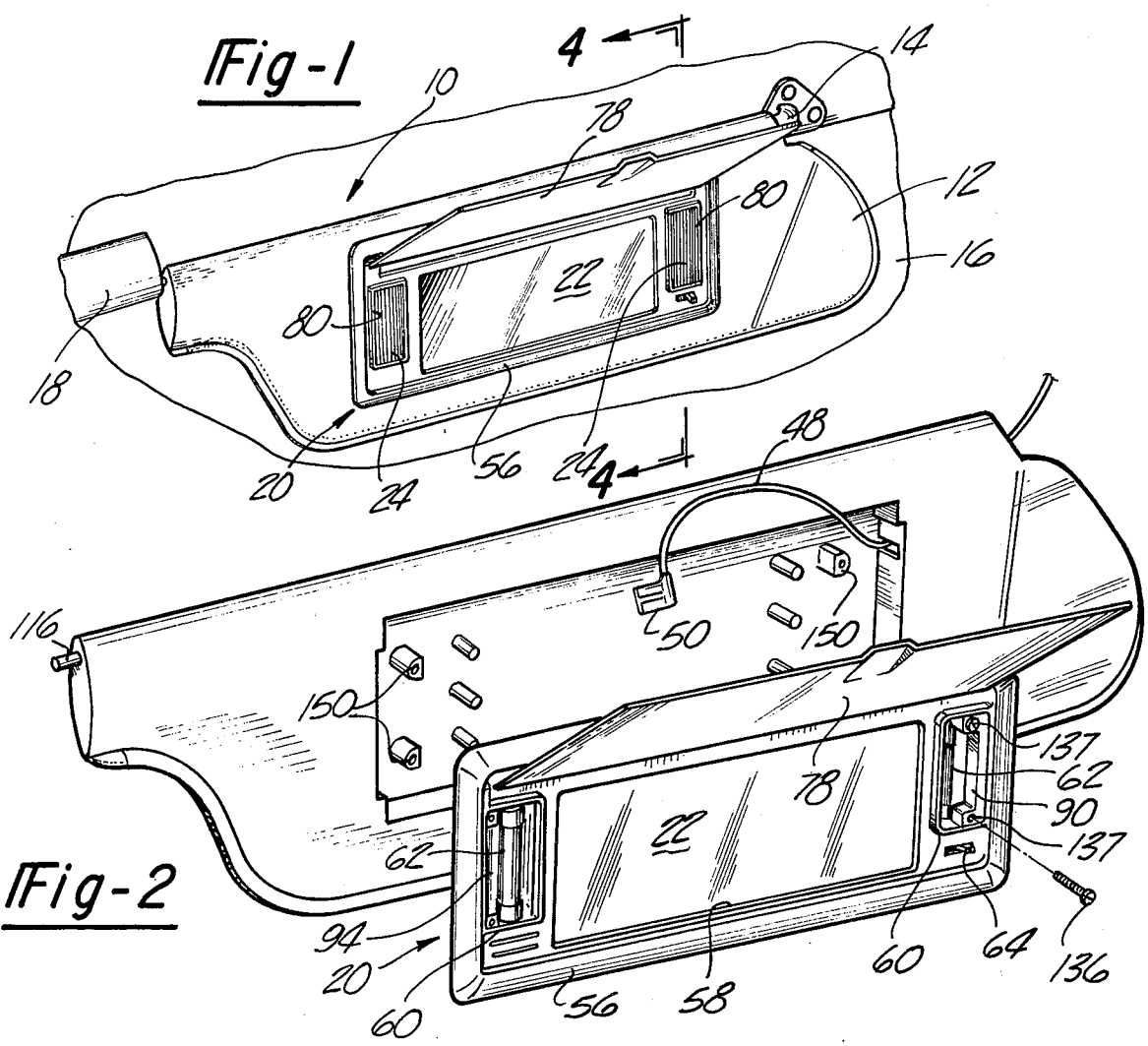
Fig-1
Fig-2
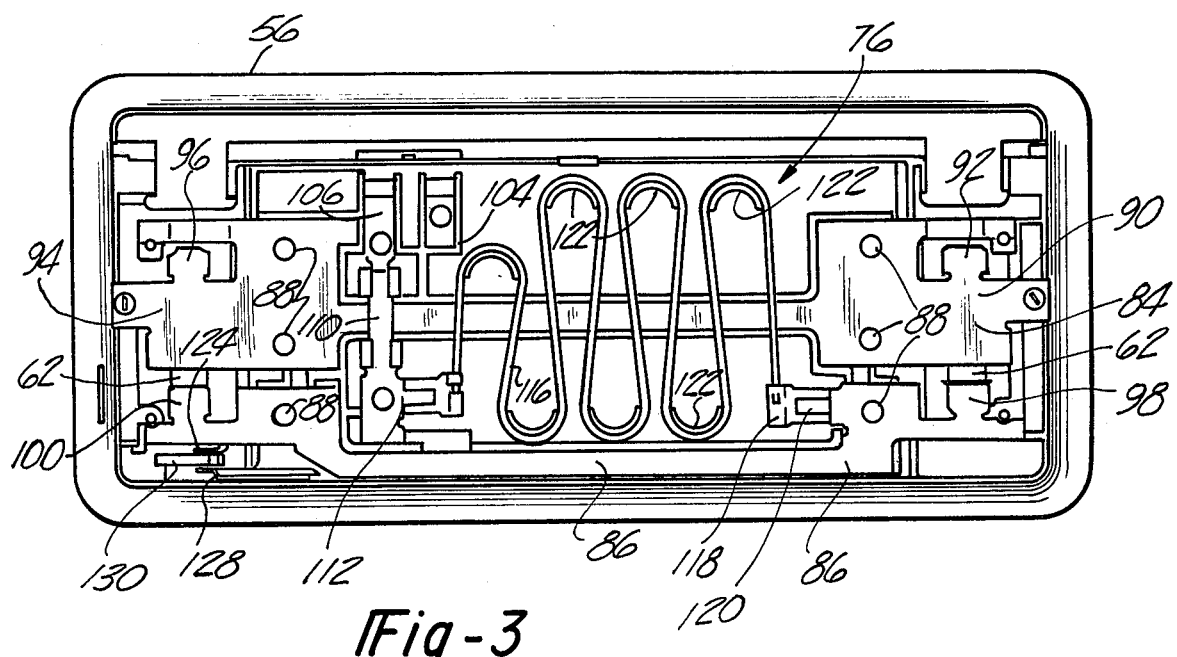
Fig-3

VISOR AND MIRROR ASSEMBLY

This is a continuation of application Ser. No. 595,894 filed July 14, 1975 and now abandoned.

This invention relates to a visor and vanity mirror assembly for vehicles and particularly to such an assembly in which the vanity mirror is illuminated.

To provide an illuminated vanity mirror incorporated in the visor of a vehicle presents problems of assembly particularly in connecting the electrical circuitry to both the power source of the vehicle and to the means illustrating the mirror. Such arrangements can become complex and difficult to service and repair.

With the foregoing in mind, a new and different visor and vanity mirror is contemplated in which the vanity mirror is illuminated and in which means for illumination and for powering the illumination is incorporated in a mirror assembly easily attachable and detachable from a visor unit.

It is another object of the invention to provide a visor and vanity mirror assembly in which the vanity mirror is illuminated by circuitry supported from the backside of the mirror.

More specifically it is contemplated to provide a visor and an illuminated mirror assembly in which the mirror can be illuminated upon moving the visor from its storage position and in which the intensity of the illumination may be varied manually at the option of a passenger.

FIG. 1 is a perspective view of a visor assembly depicting a lighted vanity mirror embodying the invention;

FIG. 2 is another perspective view at an enlarged scale, showing the vanity mirror assembly separate from the visor assembly;

FIG. 3 is a rear view of the mirror assembly seen in FIG. 2 and at an enlarged scale showing the arrangement of the circuitry for illuminating the mirror;

Figure 4:
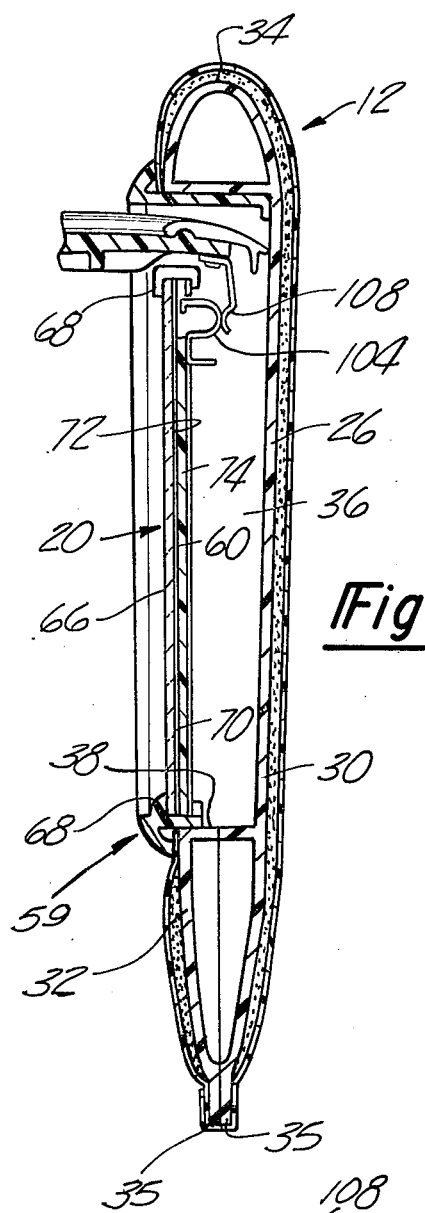
FIG. 4 is a sectional view of the vanity mirror and visor unit taken generally on line 4—4 in FIG. 1.

Referring to FIGS. 1 and 2, the visor assembly incorporating the principles of the invention is designated generally at 10 and is shown as it would appear installed at the right side of a passenger compartment of a vehicle although a similar visor assembly could be installed at the left side of the passenger compartment. The visor assembly 10 includes a visor unit 12 which is supported relative to the ceiling of the passenger compartment by means of a swivel bracket 14 at one end of the visor which permits the latter to be swung about a horizontal axis between a storage position generally parallel to the ceiling of the passenger compartment and a position generally parallel to the vehicle windshield 16. The visor 12 may be provided with an end rod 18 at the end opposite the swivel attachment 14 to releasably support the visor 12 in a bracket 19 also connected to the ceiling of the passenger compartment.

The visor assembly 10 incorporates a vanity mirror assembly 20 which includes a mirror 22 and lighting units 24 which serve to illuminate the mirror 22.

The visor 12, as best seen in FIG. 4 has a core 26 formed of a suitable material such as plastic, for example, polypropylene or the equivalent. The core 26 may be molded in a single piece to form a pair of generally symmetrical opposed wall portions 30 and 32 which after molding may be folded against each other about a juncture or hinge point 34 between the walls 30 and 32, and thereafter, the free peripheral edges 35 of the walls may be cemented or otherwise fastened together. This forms a visor 12 having a generally hollow construction forming an internal cavity 36. The wall 32 of the visor 12 is provided with an opening 38 to receive the mirror assembly 20.

Figure 5:
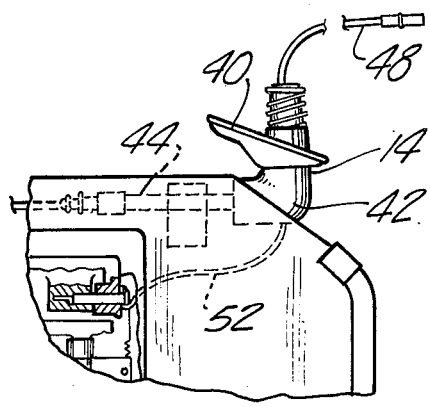
FIG. 5 is a broken-away portion of one portion of the vanity mirror and visor unit showing the mounting bracket arrangement for the latter.

As best seen in FIG. 5, the support bracket structure 14 for the visor 12, includes a bracket 40 which may be fastened to the wall or ceiling portion of the passenger compartment of the vehicle and may be electrically grounded in any conventional manner to the vehicle chassis. The bracket 40 pivotally supports an elbow bracket 42 which is L-shaped so that one of its legs may pivot about a generally vertical axis. The other leg of the L-shaped bracket 42 is provided with a rod 44 which is journaled within a cavity formed in the visor core 26. The vertical axis of the elbow 42 permits the visor to be swung approximately 90° between a position generally parallel to the windshield of the vehicle and a position at one side of the passenger compartment. The other leg of the elbow 42 and the rod 44 permit swinging movement of the visor between its storage position, in which it lies generally parallel to the ceiling of the passenger compartment and a generally vertical position in which it is operative to shield the passenger compartment from sun's rays.

The elbow 42 as well as the rod 44 are generally tubular and receive a power conductor 48 which may be connected to a source of electrical power on the vehicle and having its other end provided with an electrical connector 50 disposed within the cavity 36 of the visor 12. A separate ground conductor 52 is connected to the elbow bracket member 42 and passes through a cavity in the visor 12 to have an end disposed within the cavity 36. The conductor wires 48 and 52 provide a souce of power for the mirror assembly 20 in a manner to be later described.

The vanity mirror assembly 20 includes a frame structure 56, the forward face of which has an opening 58 for receiving and exposing the mirror 22 and frame portions 60 forming the periphery of openings exposing a pair of lamps 62 as seen in FIG. 2. Also exposed at the forward face of the frame 56 is a switch device 64. The lamps 62 and switch 64 form a part of an electric circuit means which is disposed at the backside of the mirror asembly 20.

Referring now to FIG. 4, the mirror 22 is disposed in a mirror frame 59 forming the periphery of the opening 58 for the mirror so that a forward reflective surface 66 is engaged by flange portions 68 formed around the forward edge of the mirror frame 59. The rear side 70 of the mirror 22 has the customary reflective coating. Disposed against the back surface 70 of the mirror is a layer of sponge-like tape 72, the mirror side of which is provided with an adhesive. The tape 72 is applied to the rear surface 70 of the mirror 22 and the opposite surface of the tape 72 is seated against a mounting board 74 on which the electrical circuitry 76, seen in FIG. 3 is supported. The tape 72 prevents separation of any broken glass particles in the event that the mirror should be struck with a blow of sufficient magnitude to break the mirror. Separated particles are retained in position relative to the remainder of the assembly by the tape 72.

As seen in FIG. 1 through 4, the frame structure 56 of the mirror assembly 20 also supports a cover 78 which is connected to the frame 56 by hinge connection at each end of the cover 78. This arrangement provides for covering the mirror 22 and lighting 24 when the vanity mirror is not in use and also provides means for actuating or energizing the circuit system 76 at the rear of the mirror assembly 20, as will be later described.

The lighting means for the mirror 22 includes the lamps 62 and a pair of lenses 80 which are releasably supported in complementary openings surrounded by the frame portion 60. The lighting means also includes the circuitry 76 which is fastened to the mounting board 74 at the rear of the mirror assembly 20.

The circuitry 76 is disposed on the mounting board 74 which is generally of the same size as the mirror 22 and is made of a plastic electrically nonconductive material. As seen in FIG. 3, the circuitry 76 includes an irregularly shaped ground conductor 84 and power conductor 86 which extend generally longitudinally of the frame 56 in spaced apart relationship and are connected to the mounting board 74 by means of plastic pegs 88 forming part of the mounting board 74 and passing through openings in the conductors 84 and 86. The ends of the pegs 88 are deformed to retain the conductors in position on the mounting board 74.

The conductors 84 and 86 are formed of a thin metallic material such as stainless steel sheet having relatively good current conducting and light reflecting characteristics. The conductor 84 is provided at one end with a reflector portion 90 and a socket portion 92 for receiving one end of one of the lamps 62. The opposite end of the conductor 84 is similarly provided with a reflector portion 94 and a socket portion 96 for receiving one end of the other lamp 62. The power conductor 86 is provided at its opposite ends with socket portions 98 and 100 for receiving the ends of the pair of lamps 62, respectively. The lamps 62 are installed in their sockets 92, 98 and 96, 100 so that when an electrical circuit is completed through the conductors 84 and 86 the lamps are illuminated. The conductors 84 and 86 serve not only to transfer current and to act as a heat sink, but also reflect light from the lamps 62.

Figure 6:
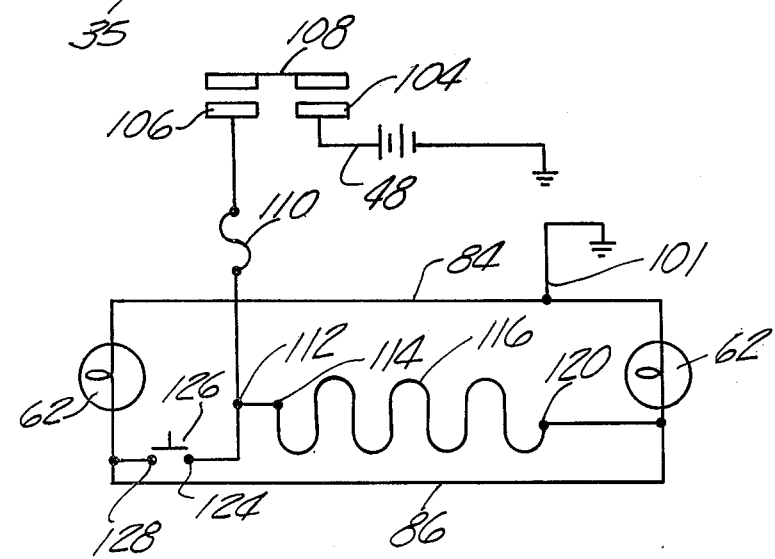
FIG. 6 is a schematic diagram of the lighting system circuitry.

The ground conductor 84 is connected to a grounded portion of the vehicle by means of the wire 52 (FIG. 5). The power conductor 86 is connected indirectly to the power conductor or cable 48 at a terminal 104 on the mounting board 74. The circuitry 76 disposed at the rear of the mirror assembly 20 can best be understood by referring first to FIG. 6 showing a schematic illustration of the circuitry 76. The terminal 104 may be electrically connected to a contact 106 through means of a selector switch 108. The terminal 106 is connected through a fuse 110 to a juncture terminal 112. The juncture terminal 112 receives a connector 114 at one end of a resistance wire 116, the other end of which is provided with a connector 118 connected to a terminal 120 adjacent one end of the power conductor 86. The resistance wire 116 is looped around hook portions 122 formed integrally with the mounting board 74 as seen in FIG. 3 and serve to secure the resistance wire 116 in position. The terminal 112 also is connected electrically to a contact 124 of a switch assembly 126. Another contact 128 of the switch is connected directly to the power conductor 86. As shown in FIG. 3, a sliding switch element 130 is disposed between the contacts 124 and 128 in a position isolating the contacts from each other. Upon sliding movement of the element 130 to the left from the position shown in FIG. 3, an electrically conductive path is made between the contacts 124 and 128 to place the juncture terminal 112 into electrical communication with the conductor 86.

Referring now to FIG. 6, with the switch 108 closing the terminals 104 and 106 relative to each other, power is communicated through the fuse 110 to the juncture 112. With the switch 126 in its open position, a conductive path is created through the resistance wire 116 to the terminal 120 and therefore to the conductor 86. The conductor 86 is connected to one end of the lamps 62 and the opposite ends of each of the lamps is connected to the ground conductor 84 as described previously. Under this condition, with the switch 108 closed and the switch 126 open, the current flow is through the resistance conductor 116 which reduces current flow and accordingly the amount of illumination afforded by the lamps 62.

With the switch 108 closed and the switch 128 in its closed position, a conductive path is created from the juncture 112 through the switch 126 directly to the conductor 86. In this manner, the resistance conductor 116 is in effect shunted so that there is no reduction in the energization of the conductor 86 and therefore the lamps 62, and accordingly the lamps will provide greater illumination than when the switch 126 is in its open position.

Referring now to FIG. 4, the switch 108 is in its open position when the cover 78 is in its closed position. Similarly, when the cover 78 is swung in a clockwise direction, as viewed in FIG. 4, toward its open position the switch 108 simultaneously engages the contacts 104 and 106 to place them in conductive communication with each other. In other words, the selector switch 108 is actuated upon opening of the cover 78 so as to activate the circuitry 76 and the lighting system.

The mirror assembly 20 is detachably secured in the cavity 36 of the visor 12 by means of screws such as indicated at 136 which pass through a pair of openings 136 adjacent to the lens frames 60 in the frame structure 56 and into screw receiving posts 150 formed integrally with the visor core 26 and appropriately positioned within the cavity 36 of the visor 12. After the screws fasten the mirror frame assembly 20 to the visor 12, the lenses are positioned in their frame 60 to conceal the screws and to deflect light from the lamps 62.

Figure 7:
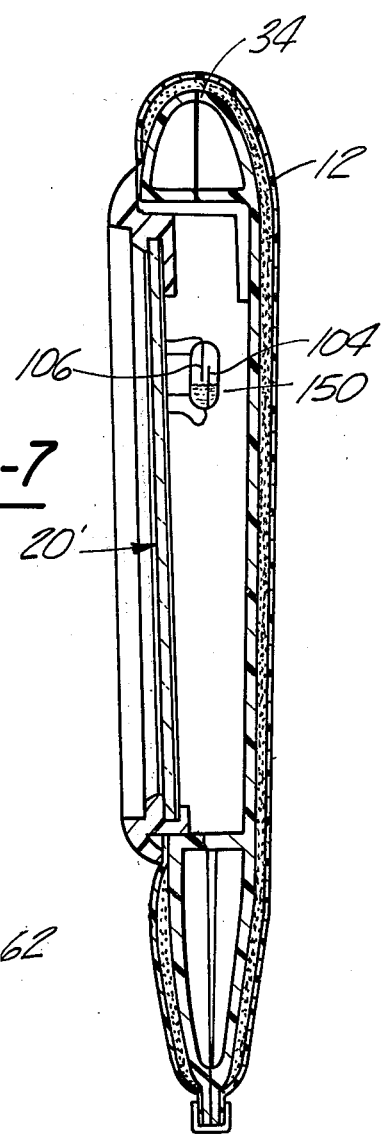
FIG. 7 is a sectional view similar to FIG. 4 but showing another embodiment of the invention.

Referring now to FIG. 7, a modification of the invention is illustrated in which a mirror assembly 20' is installed in the visor unit 12. The visor assembly 20' is identical to the visor assembly 20 shown in FIG. 4 in all respects excpet that the mirror assembly 20' does not have a cover for the mirror and a mercury switch 150 is used instead of the selector switch 108 employed in the embodiment of the invention shown in FIG. 4. In the modified form of the invention, the terminals 104 and 106 form part of the mercury switch 150 which in the usual manner is provided with a quantity of mercury which serves to maintain an electrically conductive path between the terminals 104 and 106 when the visor 12 is in its vertical position as seen in FIG. 7. When the visor 12 is swung to its storage or horizontal position the mercury contacts only the terminal 104 so that the circuitry 76 at the back of the mirror is not energized and the lamps 62 are not illuminated.

In both forms of the invention, as seen in FIGS. 4 and FIGS. 7, the electrical circuitry is disposed at the rear of the reflective surface of the mirror 20 and a resilient cushion means is interposed between the mounting board of the electric circuitry and the mirror. The cushion means acts to absorb shocks which might be transmitted to the mirror and its opposite surfaces are provided with an adhesive material adhering to the mirror so that in the event that the latter should break the particles are retained on the cushion means and the mounting board.

The mirror may be easily removed from the visor unit for replacement or repair and also facilitates the manufacturing process so that at final assembly it is necessary only to assemble the mirror assembly 20 or 20' with the visor 12 since the various switches and circuitry are already preassembled to the back of the mirror 20 and 20'.

A visor and vanity mirror assembly have been provided in which the circuitry including the illuminating lamps and reflective surfaces therefore are supported at the rear of the mirror. The lighting circuitry is energized in one embodiment of the invention by the opening or closing of a cover over the mirror and in another embodiment of the invention by moving the visor from its storage position to a vertically depending position in which it would be employed to shield a passenger from the sun's rays. The circuitry includes a dimmer switch by which the intensity of the lighting system may be manually varied at the option of the passenger.

The embodiments of the invention in which an exclusive property or privilege is claimed are defined as follows:

1. A vanity mirror and visor unit for an automobile or the like comprising; a visor swingable on an approximately horizontal axis between a storage and an operative position, means delivering electric current from a source to said visor, a vanity mirror assembly supported on said visor, said vanity mirror assembly including a mirror, cushion means on the rear of said mirror, circuit means attached to and supported on said cushion means, said circuit being operatively connected to said means delivering electric current, light means for illuminating said mirror supported by said circuit means and relative to said mirror and being operatively connected to said circuit means, and switch means movable from an open position to a closed position to energize said circuit to illuminate said light means.

2. The combination of claim 1 in which said switch means is movable to a closed position in response to movement of said visor from storage to said operative position.

3. The combination of claim 1 and further comprising a mirror cover for said mirror movable between positions covering said mirror and a position exposing said mirror.

4. The combination of claim 3 in which said cover is supported for hinging movement about a horizontal axis above said mirror.

5. The combination of claim 3 in which said switch means is movable to a closed position to illuminate said lights in response to movement of said cover from its closed to its open position.

6. The combination of claim 1 in which said circuit means includes a mounting board of nonconductive material conforming to the size of said mirror and supported on the rear surface thereof.

7. The combination of claim 6 in which said circuit means includes a pair of electrical conductors mounted on said board and projecting beyond opposite ends of said board to form a pair of reflector portions, and light means including a pair of lamps spaced apart and each being in electrical contact with both of said conductors and aligned with said reflector means.

8. The combination of claim 7 in which one of said conductors forms both of said reflector portions.

9. The combination of claim 6 in which the cushion means are interposed between said mounting board and the rear of said mirror.

10. The combination of claim 9 in which said cushion means includes opposed adhesive surfaces adhering to said mirror and to said mounting board respectively.

11. The combination of claim 1 in which said circuit means includes switch means operable to vary the intensity of said light means.

12. The combination of claim 1 in which said circuit means includes a pair of elongated, flat conductors disposed parallel to said mirror, one of said conductors forming a pair of light reflecting surfaces and a pair of lamp contacts disposed at opposite ends of said one conductor, the other of said conductors forming a pair of lamp contacts at opposite ends thereof, and a pair of lamps disposed adjacent said light reflecting surfaces, respectively, and each being electrically coupled to one lamp contact on each of said conductors.

13. The combination of claim 1 in which said circuitry means includes a pair of conductors, dimmer means comprising a resistance between said conductors, and a dimmer switch manually operable to selectively connect said conductors to each other through said dimmer switch or through said resistance to alter the light intensity of said lamps.

14. The combination of claim 13 wherein a selector switch has a pair of contacts, one of said contacts being connected to said source of power and the other of said contacts being connected to one of said conductors, said resistance having one of its ends connected to one of said switch contacts and the other end of said resistance being connected to said second conductor, and said dimmer switch being connected to said one switch contact and to said second conductor.

15. The combination of claim 1 in which said circuit means includes a selector switch having a pair of contacts, one of said contacts being connected to said source of power and the other said contacts being connected to one of said conductors, a cover for said mirror movable between open and closed positions, a switch member on said cover simultaneously engageable with said pair of contacts upon movement of said cover to its open position relative to said mirror.

16. The combination of claim 15 in which said selector switch is a mercury switch operable to close contacts between said power source and one of said conductors upon movement of said visor from its storage position.

17. A vanity mirror and visor unit for a vehicle or the like comprising; an elongated visor, means delivering electric current from a source to said visor, an elongated vanity mirror assembly supported on said visor, said vanity mirror assembly including an elongated mirror, circuit means including a pair of conductors extending from one end of said mirror to the other, said conductors being attached to and supported on the rear surface of said mirror, said conductors being operatively connected to said means delivering electric current, light means associated with opposite ends of said mirror for illuminating the front surface of said mirror supported by said conductors relative to said mirror and being operatively connected to said conductors, and switch means movable from an open position to a closed position to energize said circuit means to illuminate said light means.

18. A vanity mirror and visor unit for a vehicle or the like comprising; an elongated visor, means delivering electric current from a source to said visor, an elongated vanity mirror assembly supported on said visor, said vanity mirror assembly including an elongated mirror, circuit means including a pair of conductors extending from one end of said mirror to the other, said conductors being attached to and supported on the rear surface of said mirror, said conductors being operatively connected to said means delivering electric current, light means associated with opposite ends of said mirror for illuminating the front surface of said mirror supported by said conductors relative to said mirror and being operatively connected to said conductors, switch means movable from an open position to a closed position to energize said circuit means to illuminate said light means, and a mounting board of electrically nonconductive material supported on a rear surface of said mirror, said circuit means and light means being supported from said mounting board.

19. The combination of claim 18 and further comprising a cover for said mirror movable from a covering to an open position, said switch means being movable to a closed position upon movement of said cover to an open position.

20. The combination of claim 18 in which said visor is swingable about a horizontal axis from a storage to an operative position, a cover for said mirror movable from a covering to an open position about an axis above said mirror when said visor is in said operative position, said switch means being movable to said closed position upon movement of said cover to said open position.

21. The combination of claim 18 wherein said switch means includes a part supported by said mounting board.

* * * * *

UNITED STATES PATENT AND TRADEMARK OFFICE
CERTIFICATE OF CORRECTION

PATENT NO. : 4,075,468
DATED : February 21, 1978
INVENTOR(S) : Konrad H. Marcus

It is certified that error appears in the above-identified patent and that said Letters Patent are hereby corrected as shown below:

Column 1, line 12, "illustrating" should read --illuminating--

Column 2, line 12, "wih" should read --with--

Column 4, line 53, "excpet" should read --except--

Signed and Sealed this

Sixteenth Day of May 1978

[SEAL]

Attest:

RUTH C. MASON
Attesting Officer

LUTRELLE F. PARKER
Acting Commissioner of Patents and Trademarks